United States Patent [19]
Carter

[11] Patent Number: 5,744,737
[45] Date of Patent: Apr. 28, 1998

[54] MUSCLE CONTROL DEVELOPMENT SYSTEM AND KIT THEREFOR

[76] Inventor: Darryl Carter, 1459 W. 47th St., Chicago, Ill. 60609

[21] Appl. No.: 736,384

[22] Filed: Oct. 24, 1996

[51] Int. Cl.⁶ ........................................................ G10D 13/02
[52] U.S. Cl. ............................. 84/411 P; 84/465; 434/247
[58] Field of Search ................................. 84/411 P, 465; 434/258, 247

[56] References Cited

U.S. PATENT DOCUMENTS 5,520,090  5/1996  Eagle ...................................... 84/411 P

OTHER PUBLICATIONS

Thoroughbred Music, Inc. catalog (cover and p. 75), undated. The enclosed document is undated; however, applicant submits that the document was published prior to the filing date of the present application. Applicant respectfully requests that the enclosed document be made record.

*Primary Examiner*—Cassandra Spyrou
*Attorney, Agent, or Firm*—Welsh & Katz

[57] ABSTRACT

A muscle control development system for developing selected hand, wrist and arm muscles of a user includes first and second rimless pads formed of a resilient, elastically deformable material. The first pad is a pancake pad having a relatively thin profile and having a thickness to diameter ratio of about 0.04. The pancake pad is configured to absorb a relatively small amount of force exerted thereon by a drumstick and to exhibit a relatively large rebound therefrom. The second pad is a biscuit pad having a larger thickness profile than the pancake pad, and having a thickness to diameter ratio in a range of about 0.20 to about 0.30. The biscuit pad is configured to absorb a relatively larger amount of force exerted thereon than the pancake pad and to exhibit a lesser rebound therefrom. The system includes a pea pad exerciser formed of the resilient material, and configured for placement between the user's fingers and thumb for exercising selected muscles. The system further includes a drum rudiment chart depicting a plurality of drum practice exercises.

20 Claims, 5 Drawing Sheets

FIG. 8A

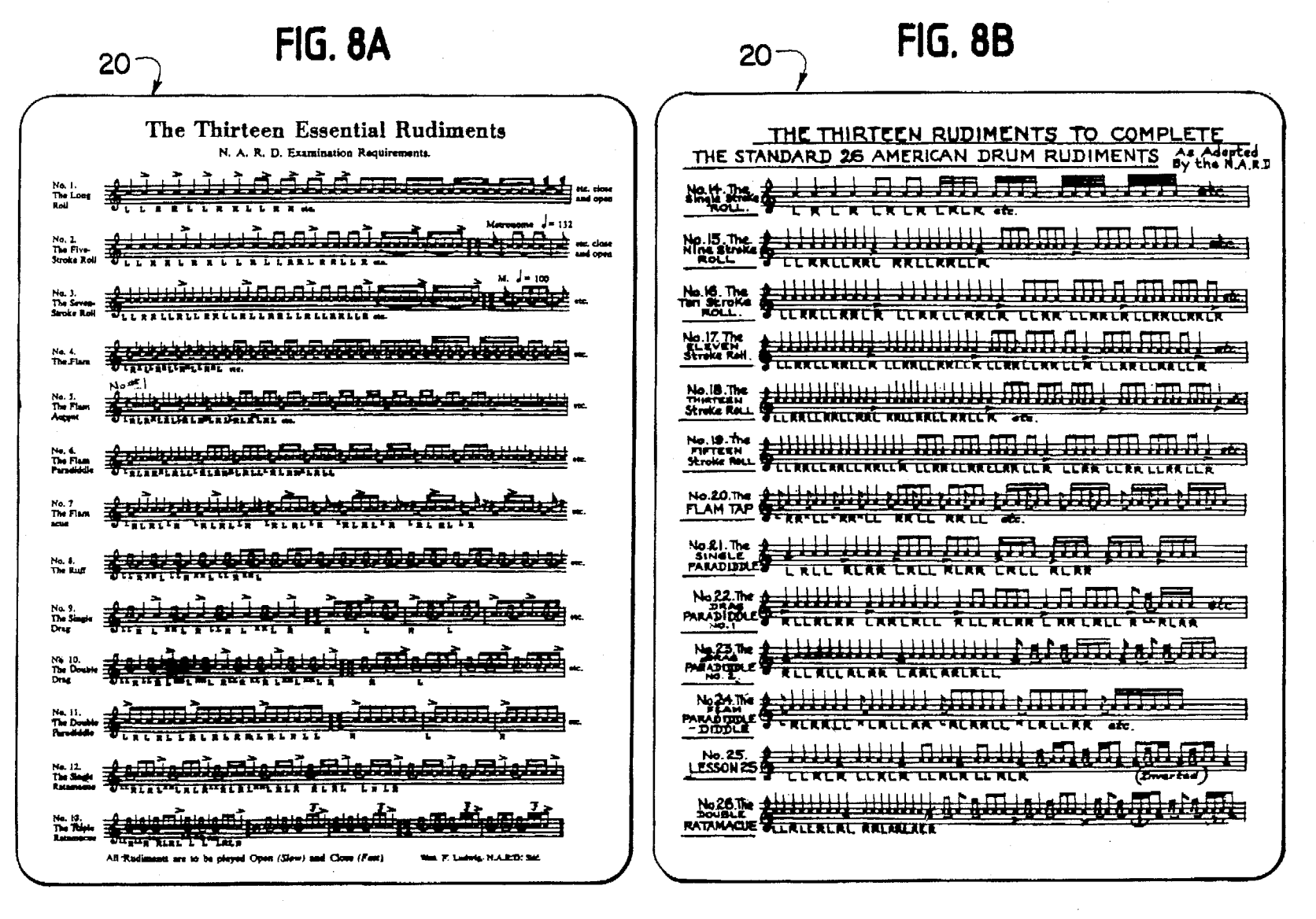

The Thirteen Essential Rudiments
N.A.R.D. Examination Requirements

FIG. 8B

THE THIRTEEN RUDIMENTS TO COMPLETE
THE STANDARD 26 AMERICAN DRUM RUDIMENTS As Adopted By the N.A.R.D.

MUSCLE CONTROL DEVELOPMENT SYSTEM AND KIT THEREFOR

FIELD OF THE INVENTION

This invention relates to a muscle control development system and kit for developing control of selected muscles. More particularly, the invention relates to a muscle control development system for developing control of the muscles used in drumming and a comprehensive kit for developing such muscles.

BACKGROUND OF THE INVENTION

Those involved in the music industry, and in particular musicians, recognize not only that talent is required for playing any instrument, but that in addition, practice and physical development are a necessity. Most non-musicians in all likelihood do not realize the substantial amount of development that is required in playing percussion instruments, such as drums, toms and the like.

Percussion instruments require an extraordinary amount of training and development for a number of reasons. First, strength, and as importantly, stamina, are required to maintain playing for any considerable amount of time. Given that drummers can often be required to continuously play a drum set for an hour or more, the amount of strength and stamina required is quite substantial.

Additionally, as important as strength and stamina, a very high degree of physical control is required to maintain control of a player's drum stick strokes, commonly referred to as drummer's chops. Stick control is important, not only for the downstroke during which the drums are hit, but also during the upstroke, i.e., the rebound from striking the drum skins. The upstroke must be controlled to provide the correct tone on the drum, to prepare for the next downstroke, to minimize the work required for the downstroke, and to conserve as much energy as practicable for continued play time.

Individual practice aids are known in the art for drum practice, muscle development and chop control. Such practice aids include gel-filled pads which are mounted to a rigid backing member by a frame. The gel-filled pad backing member typically includes suction cups thereon to mount that pad to a surface, such as a table top. Other practice aids include individual gum rubber and neoprene pads, typically about ¼ inch thick for drumming practice. Such individual pads may be mounted to a rigid backing member and may be mountable, for example, to the user's leg, by straps or elastic bands.

More sophisticated practice aids include stands to which neoprene and gum rubber practice pads can be mounted. The stands can be arranged in standard and custom drum configurations as desired by each individual user. The drum pads of such sophisticated, custom arrangement, however, are of the same type as those used in the individual pad practice devices.

Other, non-percussion practice devices are also available for percussionists to assist in muscle development and chop control. One known device for exercising the muscles of the hand and the fingers includes a plurality of parallel plates which are separated by springs. The plates are squeezed together, against the force of the spring, to exercise the desired muscles.

Although all of the known practice aids and devices clearly are beneficial to the percussionist, there continues to be a need for a complete and comprehensive practice system which includes a plurality of pads having differing bounce or rebound characteristics as well as non-contact devices for exercising the muscles used for percussion instruments. Such a system preferably includes the necessary musical scales and drum beat tempo practice aids as well as illustrative exercises for proper muscle control development.

SUMMARY OF THE INVENTION

A muscle control development system, produced as a kit, for developing selected hand, wrist and arm muscles of a user, includes first and second rimless pads formed of a resilient, elastically deformable material, and finger formed exercisers, referred to as pea exercisers, also formed of the resilient material. The kit further includes a drum rudiment chart depicting a plurality of drum practice exercises.

The first pad is a pancake pad having a relatively thin profile of about 0.30 inches in thickness. The pancake preferably has a thickness to diameter ratio of about 0.04. The pancake pad is configured to absorb a relatively small amount of force exerted thereon by a drumstick and to exhibit a relatively large rebound therefrom.

The second pad is a biscuit pad having a larger thickness profile than the pancake pad. The biscuit pad preferably has a thickness to diameter ratio in a range of about 0.20 to about 0.30. The biscuit pad thickness profile is in a range of about 1.0 to about 1.1 inches. The biscuit pad is configured to absorb a relatively larger amount of force exerted thereon than the pancake pad and to exhibit a lesser rebound therefrom.

The system includes at least one, and preferably two pea exerciser pads. The pea pads are configured for placement between the user's forefinger tip and thumb tip and the user's forefinger base and thumb base. Each pea pad is configured to be compressed between the fingers and the thumb for exercising selected hand, wrist and finger muscles.

The pads can be formed of a silicon rubber, and can be pressure cured.

In one embodiment, the pea pad has a generally conical shape having a rounded top portion and a bottom portion having a transversely extending flange-like configuration. This configuration facilitates gripping the pea and precludes slipping from the hands during use.

When prepared as a kit, the drum rudiment chart may be configured as a laminated, double-sided, single sheet to prevent damage and reduce wear and tear during use.

Other features and advantages of the present invention will be apparent from the following detailed description, the accompanying drawings, and the appended claims.

BRIEF DESCRIPTION OF THE FIGURES

FIG. 2b is a top view of the biscuit pad of FIG. 2a;

FIG. 3b is a top view of the pancake pad of FIG. 3a;

FIG. 4b is a top view of the pea exerciser of FIG. 4a;

FIGS. 8a and 8b show both sides of the laminated, illustrative chart which depicts the rudiments of percussion practice.

DETAILED DESCRIPTION OF THE PREFERRED EMBODIMENTS

Figure 1:
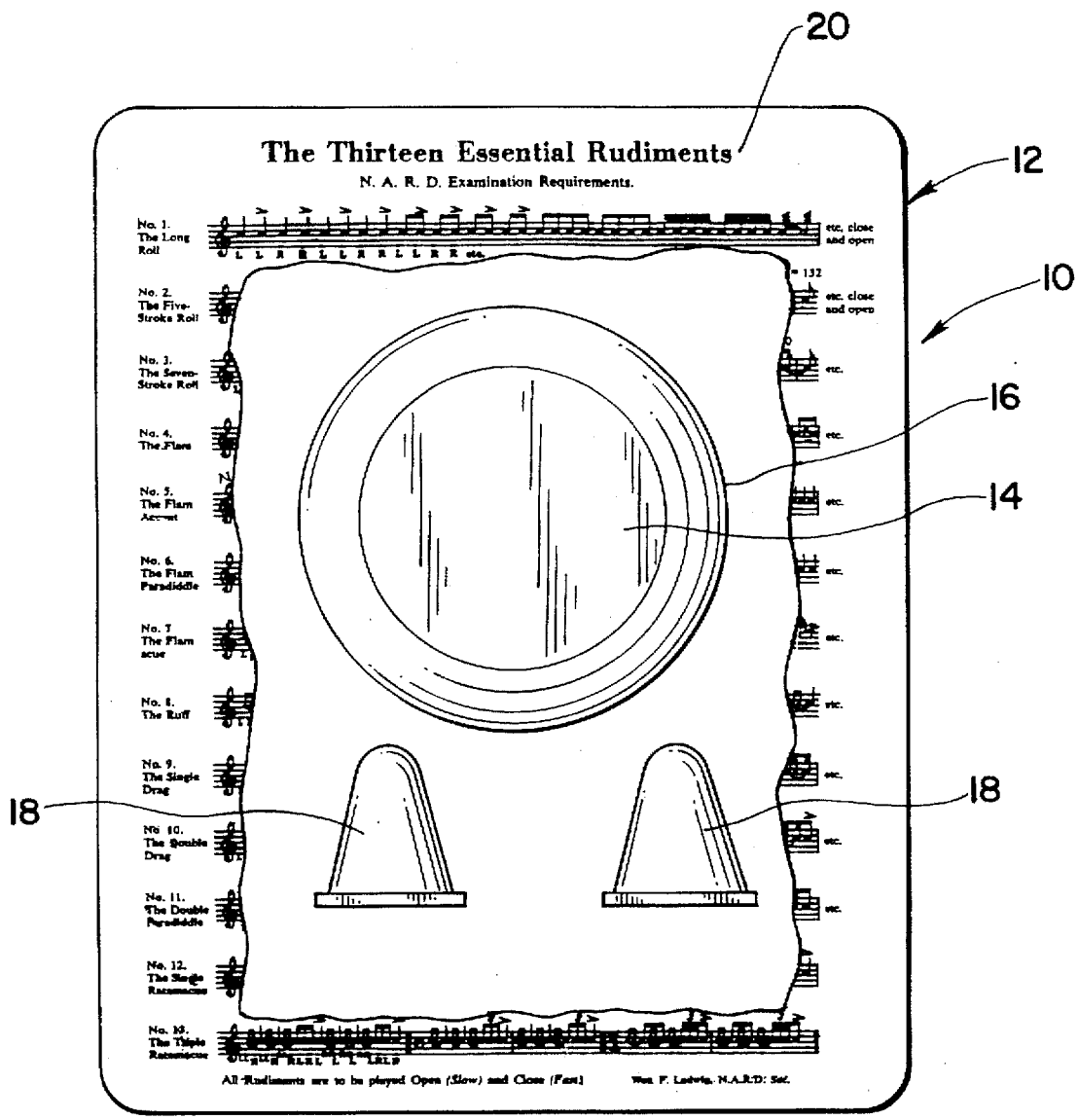
FIG. 1 is an exemplary muscle control development kit embodying the principles of the present invention, the kit being illustrated with a plurality of practice pads, a pair of pea exercisers and a prepared, single sheet, double-sided drum rudiment chart.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Referring now to the figures, and particularly to FIG. 1, there is shown in kit form 10, a muscular control development system 12. As illustrated in FIGS. 2–4, the system 12 includes a plurality of percussion practice pads 14, 16 and at least one pea pad or exerciser 18. The system 12 may also include a chart 20 or like illustration of the rudiments of percussion practice, as shown in FIGS. 8a and 8b. The system 12 is configured to facilitate practicing the rudiments of drum beats and drum tempo strokes.

The system 12 is also configured to exercise the muscles which are used to affect the drum strokes. Such muscles include the abductor, adductor and opponens muscles of the hand, the extensor, flexor, supinator and pronator muscles of the lower arm and wrist, and the biceps, triceps and brachialis muscles of the upper arm.

The practice pads include a biscuit pad 14 and a pancake pad 16. The practice pads 14, 16 will described herein in descending order of thickness, along with other, non-striking, e.g, exercise-type, uses for each pad 14, 16.

Figure 2B:
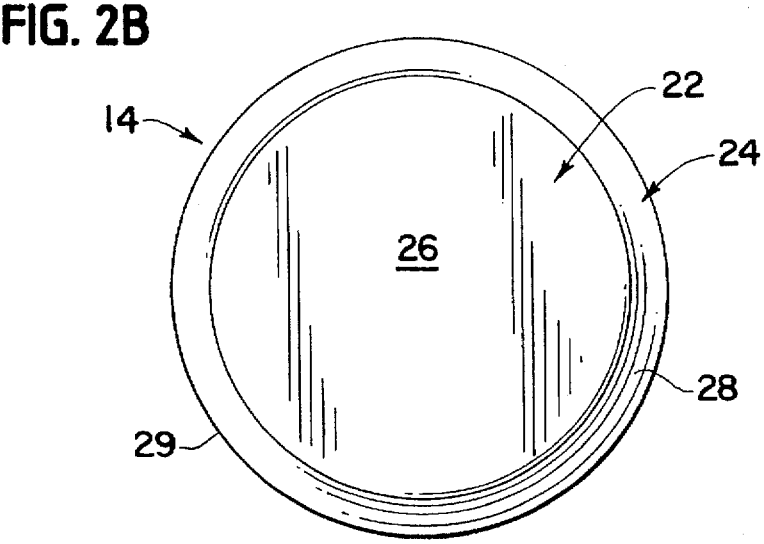
Figure 2A:
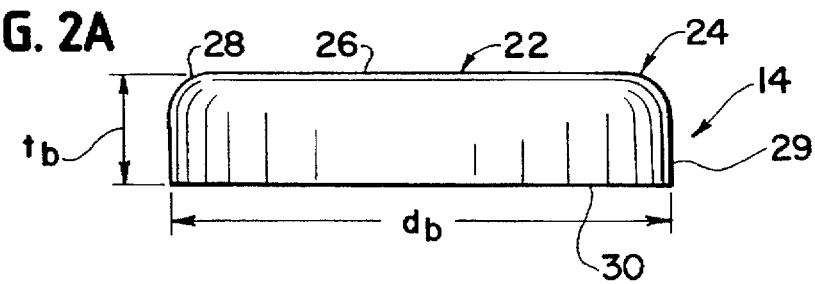
FIG. 2a is a side view of a biscuit pad of the muscle control development kit.

The biscuit pad 14 is illustrated in FIGS. 2a and 2b. The biscuit 14 has a main practice portion 22 and a rim portion 24. The main practice portion 22 is a flat, planar surface 26. The rim 24 is contiguous with the main practice portion 22 and is rounded, as illustrated at 28. In a current embodiment, the biscuit 14 has a diameter $d_b$ of about 4½ inches to about 4⅝ inches. The rounded rim 28 is formed with a radius of curvature of about ¼ inch. The main practice portion 22 thus has a planar surface 26 with a diameter of about 4 to about 4⅛ inches.

The biscuit 14 is adapted to serve as both a practice pad and as a physical, muscular exerciser. As a practice pad, the biscuit 14 has a thickness $t_b$ sufficient to absorb a significant portion of the force exerted thereon by a drum stick striking the surface. As such, because most of the force is absorbed, the rebound or reaction of the drum stick is relatively small. The diameter $d_b$ of the biscuit pad 14 was selected to advantageously provide an area of focus or aim for the practicing drummer, which further enhances and develops stick control.

In a current embodiment, the biscuit pad 14 has a thickness $t_b$ of about 1 inch to about 1 1/10 inches. Because of the relatively high thickness to diameter ratio, the biscuit 14 is a relatively rigid structure. In a current embodiment, the biscuit pad 14 had a thickness to diameter ratio of about 0.20 to about 0.30.

Figure 5:
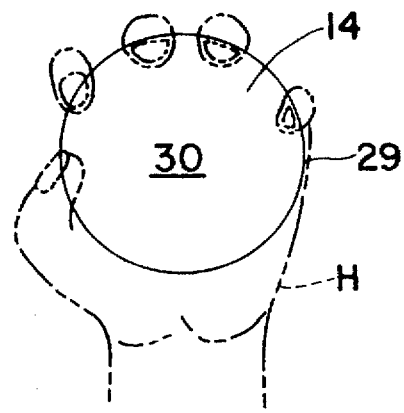
FIG. 5 is an illustration of a user grasping the biscuit pad as it would be held for one of the non-striking, exercise uses of the pad.

Referring now to FIG. 5, as a physical exerciser, the biscuit 14 is configured to fit in the palm of a user's hand H, so that the user can wrap his or her fingers around the sides 29 of the pad 14 (in the thickness direction), with the user's fingertips extending to the underside 30 of the pad 14. The biscuit pad 14 is used as an exerciser by gripping or squeezing and releasing the pad 14. Rimless construction permits use of the biscuit 14 as a gripping and squeezing exerciser. As an exerciser, the biscuit 14 is particularly beneficial in developing the muscles of the fingers, which improves the user's grip strength and grip control.

Figure 3B:
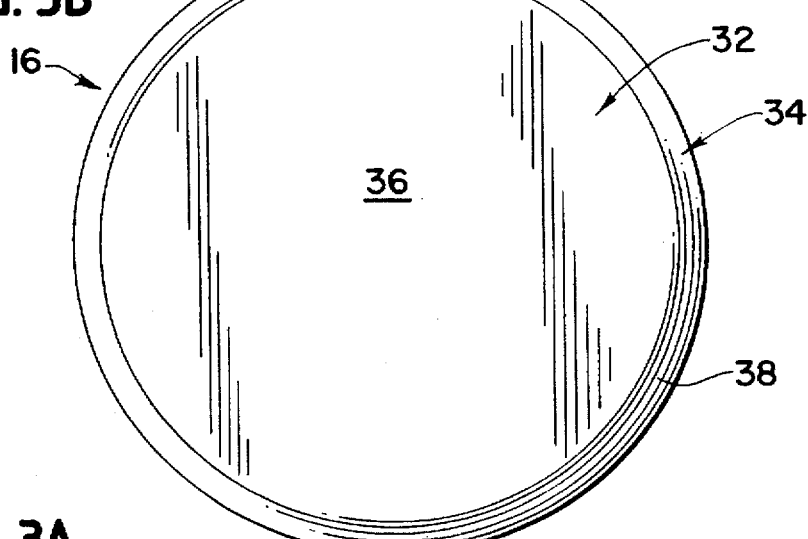
Figure 3A:
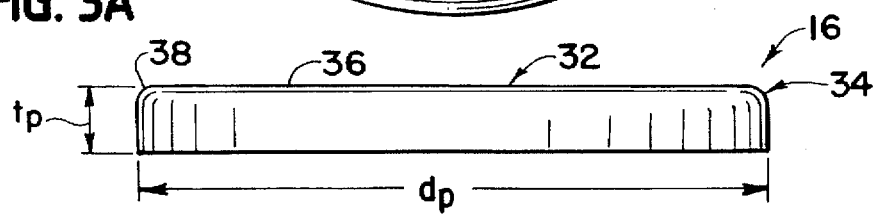
FIG. 3a is a side view of a pancake pad of the muscle control development kit.

The next pad is the pancake pad 16. The pancake pad 16 which is illustrated in FIGS. 3a and 3b, is the thinner of the practice pads. The pancake 16 has a main practice portion 32 and a rim portion 34. Similar to the biscuit pad 14, the main practice portion 32 is a flat, planar surface 36. The rim 34 is contiguous with the main practice portion 32 and is rounded, as illustrated at 38. In a current embodiment, the pancake pad 16 has a diameter $d_p$ of about 7 inches, with the rounded rim portion 38 formed with a radius of curvature of about ¼ inch. The main practice portion 32 thus has a planar surface 36 with a diameter of about 6½ inches.

Similar to the biscuit 14, the pancake 16 is adapted to serve as both a practice pad and as a physical, muscular exerciser. As a practice pad, the pancake 16 has a thickness $t_p$ which is sufficient to absorb a smaller portion of the force exerted thereon by a drum stick striking the surface. As such, because less of the force is absorbed, the rebound or reaction of the drum stick is larger in the pancake 16, relative to the biscuit 14. Thus, a drum stick striking the surface 36 will exhibit a higher relative bounce, and will facilitate the development of stick control.

Figure 6:
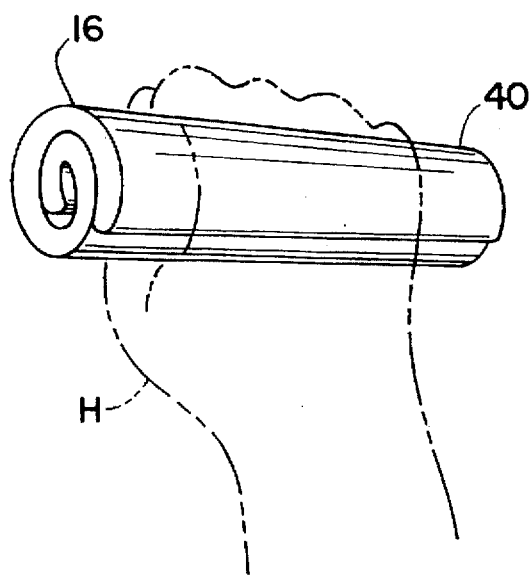
FIG. 6 is an illustration of a user grasping the pancake pad as it would be held for one of the non-striking, exercise uses of the pad, the pancake pad being shown in a rolled configuration.

In a current embodiment, the pancake pad 16 has a thickness $t_p$ of about 3/10 inch. Because of the relatively low thickness to diameter ratio, the pancake 16 is substantially less rigid than the biscuit 14. In the current embodiment, the thickness to diameter ratio is sufficiently low to permit the pancake 16 to be configured into various shapes, such as the rolled, cylindrical shape illustrated at 40 in FIG. 6. Rimless construction permits the pancake pad 16 to be configured into such various shapes. In a current embodiment, the pancake pad 16 has a thickness to diameter ratio of about 0.04.

As a physical exerciser, the pancake 16 can be rolled into the tubular or cylindrical shape 40. The tubular shape 40 facilitates exercises in which a user can grip and release the rolled pad 40. As an exerciser, the pancake 16 is particularly beneficial in developing the muscles of the wrist and forearms which improves the user's grip control, arm strength, arm control and stamina.

Figure 4A:
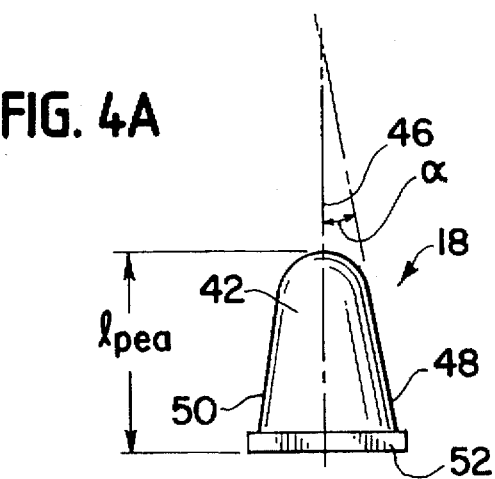
FIG. 4a is a side view of a pea exerciser of the muscle control development kit.
Figure 4B:
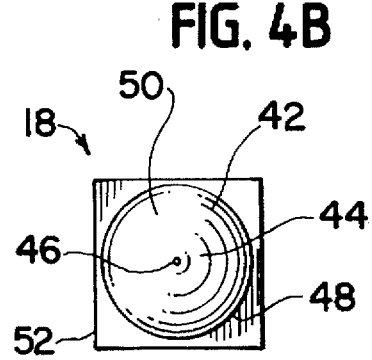

Referring now to FIGS. 4a and 4b, the muscular control development system 12 includes one or more pea exercisers 18, which are referred to as a peas. Each pea 18 is configured as an exerciser for the finger muscles and is particularly useful in developing the muscles of the thumb and in increasing the control of the thumb muscles. In a current embodiment, the pea exerciser 18 has a generally conically shaped main body portion 42 having a rounded top 44. The pea 18 defines an axis therethrough as illustrated at 46, about which it is symmetrical. Each cross-section taken about a plane perpendicular to the axis 46 defines a circle.

The pea 18 has a base portion 48 having a diameter of about 7/10 inch, and a length $l_{pea}$ from the base 48 to the top 44 of about 9/10 inch to about 1 inch. The rounded top 44 has a radius of curvature of about 5/10 inch. The sides 50 of the pea 18 define an angle α relative to the axis 46 of about 7° to about 10°.

Optionally, the pea 18 can have a flange-like bottom portion 52. In a current embodiment, the bottom portion 52 has a square shape about 3/4 inch along each side, and about 3/10 inch thick. Alternately, the pea 18 can have other shapes, such as a cylindrical shape (not shown), which will not slip from between the user's fingers when it is in use.

Figure 7A:
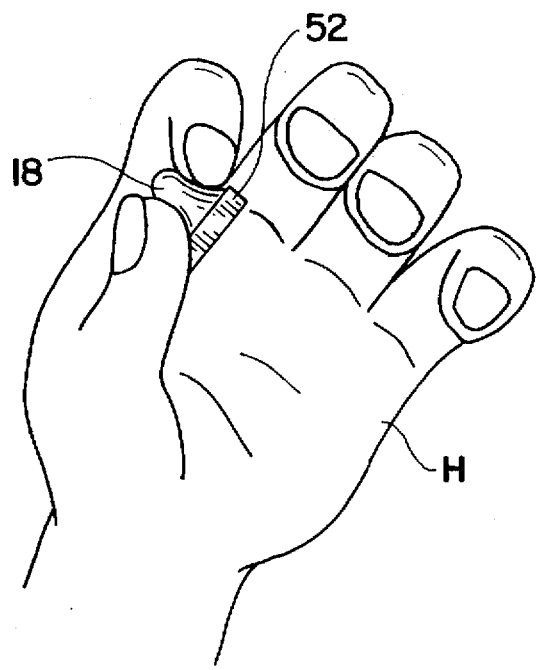
FIGS. 7a and 7b illustrate a user grasping the pea exerciser as it would be held for various of the exercise uses thereof.

The pea 18 is used as an exerciser by placing the pea 18 between the tip of a finger, such as an index finger, and the tip of the thumb, as shown in FIG. 7a. The pea 18 is successively squeezed and released. The time during which the pea 18 is compressed can be extended or shortened, and the number of repetitions can be varied to obtain the desired results. The pea 18 can then be positioned, for example, between the tip of the middle finger and the thumb, and the exercise can be repeated.

Figure 7B:
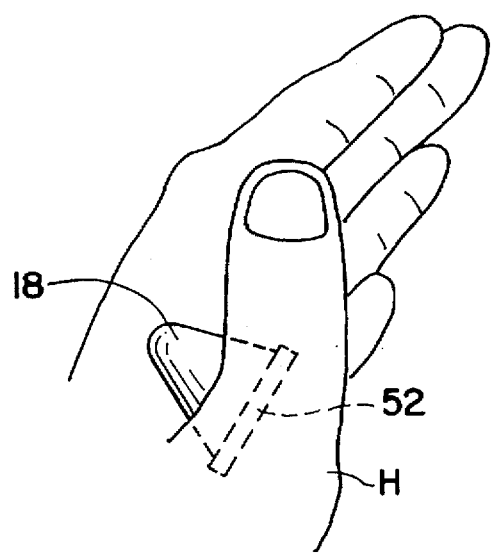

As shown in FIG. 7b, the pea 18 is also intended to be used by positioning the pea 18 in the curved portion of the hand between the base of the first, i.e., index, finger and the thumb. The pea 18 is compressed or squeezed and released. As with the other exercises, this exercise can be repeated, extended or shortened, and the number of repetitions can be varied to obtain the desired results. The pea 18 can be repositioned along the thumb toward the tip of the first finger to exercise various different muscles of the thumb.

The aforementioned pads 14, 16 and pea exerciser 18 may be formed of a variety of suitable materials. The pads 14, 16 and pea 18, however, should exhibit certain properties for proper muscle control development. The pads 14, 16, 18 must be resilient, and must exhibit an elastic deformation. A density about equal to that of water is most desirable, however, materials having the desired characteristics may have other densities. In a current embodiment, the pads 14, 16, 18 are formed of a silicon rubber RTV 1000. The current embodiment of the pads 14, 16, 18 was molded from a silicon rubber RTV (room temperature vulcanizing) 1000, available from Eager Plastics of Chicago, Ill.

The silicon may be cured using a number of different practices. It is commonly known to cure the silicon using either a standard curing method, or a rapid curing method. In a preferred method, the silicon is cured by mixing about one-half of the silicon mixture with a standard curing agent which would result in a curing time of about 8 to 10 hours, and mixing the remaining one-half of the silicon mixture with a rapid curing agent, which would result in a curing time of about 2 hours. Alternately, an ultra-rapid curing agent may be used which results in a very short curing time, generally about the time necessary to pour and set the mixture.

In a most preferred method, the pads 14, 16, 18 are formed by introducing the semi-liquid silicon mixture into a form or mold having the desired size and shape. The amount of silicon introduced into the mold depends upon the desired thickness of the pad. Following are exemplary amounts, by weight, of silicon mixture which was used to form the pads 14, 16, 18. After the silicon mixture was introduced into the mold, the silicon was subjected to pressure, at an air pressure of about 25 to about 30 pounds per square inch gauge (psig). The silicon was then allowed to cure for the proper time. The pads 14, 16, 18 were then removed from the molds.

It has been observed that the application of a pressurizing agent, such as air, at about 25 to about 30 psig, tends to force any entrained air from the mixture thus producing a homogenous, solid pad. The solid pad, in turn, produces a more consistent practice surface and exercise medium. In addition, a solid pad, rather than a pad having voids therein, tends to be more structurally sound, and can withstand the constant striking and beating to which the pad will no doubt be subjected.

In the exemplary pads 14, 16, 18 described above, the biscuit pad 14 was formed of about 270 grams of silicon rubber, the pancake 16 was formed of about 240 grams of silicon rubber and each pea pad 18 was formed of about 30 grams of silicon rubber.

The system 12 further includes an illustrative chart 20 that depicts the playing exercises, i.e., rudiments, of percussion practice. The rudiments include twenty-six drum tempo playing and examination exercises, divided into two sets of thirteen rudiments each. The rudiments, which are formally known as the Standard 26 American Drum Rudiments, are as set forth by the N.A.R.D. The rudiments include rolls of various stokes, e.g., single stroke roll and nine stroke roll, various paradiddle exercises (alternating left and right drum beat successions), various flam strokes (two stroke drum beat, the first of which is a quick grace note), and various ratamacue exercises (double stroke beat followed by a triplet beat). The aforementioned strokes, beats and exercises will be readily recognized by those skilled in the art. The various strokes, beats and exercises are to be played open, i.e., slowly, and close, i.e., quickly.

Those skilled in the art will recognize the drum rudiments, and will be familiar with the muscle and chop control development that the rudiments are intended to produce. In a preferred embodiment, the rudiment charts 20 are prepared as a single, double-sided, laminated sheet. The lamination protects the charts 20 from damage due to, for example, spills, and general wear and tear.

It is anticipated that the muscle control development system 12 will be packaged in various forms. One presently preferred form of packaging is to provide a kit, exemplary of which is the kit 10 illustrated in FIG. 1, which includes a biscuit pad 14, a pancake pad 16 and a plurality of pea exercisers 18, such as the two peas 18 included in the illustrated kit 10.

To provide a complete and comprehensive muscle control development package, the kit 10 will include the illustrated rudiments chart 20 and a brochure or manual (not shown). The manual will include directions for use of the various pads 14, 16 in their practice and exercise functions, and directions for use of the pea exercisers 18. It is anticipated that the manual will include not only directions for the form of the exercises, but also a prescribed repetition chart for short term and long term muscular development.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A drum practice pad system for development of a user's arm, hand and finger muscles for development of drum stick control, comprising:

a plurality of homogenous, rimless pads formed of a resilient, elastically deformable material, at least one of said pads being a pancake pad having a relatively thin profile in a thickness direction, and configured to absorb a relatively small amount of force exerted thereon by a drumstick and to exhibit a relatively large rebound therefrom, at least another of said pads being a biscuit pad having a larger thickness profile than said pancake pad, said biscuit pad being configured to absorb a relatively larger amount of force exerted thereon than said pancake pad and to exhibit a lesser rebound therefrom, and at least another of said pads being a pea pad configured for placement between at least one of the user's forefinger tip and thumb tip and the user's forefinger base and thumb base, at about the juncture thereof, and being configured to be compressed therebetween for exercising selected muscles of the user.

2. The drum practice pad system of claim 1 wherein said pancake pad has a thickness profile of about 0.30 inches.

3. The drum practice pad system of claim 1 wherein said biscuit pad has a thickness profile in a range of about 1.0 to about 1.1 inches.

4. The drum practice pad system of claim 1 wherein said biscuit pad has a diameter of about 4½ inches and a thickness to diameter ratio in a range of about 0.20 to about 0.30.

5. The drum practice pad system of claim 1 wherein said pancake pad has a diameter of about 7 inches and a thickness to diameter ratio of about 0.04.

6. The drum practice system of claim 1 including a pair of pea pads.

7. The drum practice system of claim 1 wherein said pea pad has a generally conical shape having a rounded top portion.

8. The drum practice system of claim 7 wherein said pea pad has a bottom portion having a transversely extending rectangular flange-like configuration.

9. The drum practice system of claim 1 further including a drum rudiment chart, said chart being configured as a laminated, double-sided, single sheet.

10. The drum practice system of claim 1 wherein said pads are formed of silicon rubber.

11. The drum practice system of claim 10 wherein said pads are pressure cured.

12. A muscle control development system produced as a kit, for developing selected hand, wrist and arm muscles of a user, the kit comprising:

first and second rimless pads formed of a resilient, elastically deformable material, said first pad being a pancake pad having a relatively thin profile in a thickness direction, and having a thickness to diameter ratio of about 0.04, said pancake pad being configured to absorb a relatively small amount of force exerted thereon by a drumstick and to exhibit a relatively large rebound therefrom, said second pad being a biscuit pad having a larger thickness profile than said pancake pad, and having a thickness to diameter ratio in a range of about 0.20 to about 0.30, said biscuit pad thickness profile being larger than said profile of said pancake pad, said biscuit pad being configured to absorb a relatively larger amount of force exerted thereon than said pancake pad and to exhibit a lesser rebound therefrom;

at least one pea pad, said pea pad being configured for placement between at least one of the user's forefinger tip and thumb tip and the user's forefinger base and thumb base, at about the juncture thereof, and being configured to be compressed therebetween for exercising selected muscles of the user; and a drum rudiment chart depicting a plurality of drum practice exercises.

13. The muscle control development system kit of claim 12 wherein said pancake pad has a thickness profile of about 0.30 inches.

14. The muscle control development system kit of claim 12 wherein said biscuit pad has a thickness profile in a range of about 1.0 to about 1.1 inches.

15. The muscle control development system kit of claim 12 including a pair of pea pads.

16. The muscle control development system kit of claim 12 wherein said at least one pea pad has a generally conical shape having a rounded top portion.

17. The muscle control development system kit of claim 12 wherein said at least one pea pad has a bottom portion having a transversely extending flange-like configuration.

18. The muscle control development system kit of claim 12 wherein said drum rudiment chart is configured as a laminated, double-sided, single sheet.

19. The muscle control development system kit of claim 12 wherein said pads are formed of a silicon rubber.

20. The muscle control development system kit of claim 19 wherein said pads are pressure cured.

* * * * *